United States Patent
Liu et al.

(10) Patent No.: US 8,884,462 B2
(45) Date of Patent: Nov. 11, 2014

(54) POWER FLOW REGULATOR INCLUDING A PLURALITY OF DC-DC CONVERTERS

(75) Inventors: Yu Liu, Milwaukee, WI (US); Christopher S. Thompson, Kingston, RI (US); Vijay Bhavaraju, Germantown, WI (US)

(73) Assignee: Eaton Corporation, Cleveland, OH (US)

( * ) Notice: Subject to any disclaimer, the term of this patent is extended or adjusted under 35 U.S.C. 154(b) by 836 days.

(21) Appl. No.: 13/014,768

(22) Filed: Jan. 27, 2011

(65) Prior Publication Data
US 2012/0194005 A1    Aug. 2, 2012

(51) Int. Cl.
*H02J 1/08* (2006.01)
*H02J 1/10* (2006.01)

(52) U.S. Cl.
CPC ..................................... *H02J 1/102* (2013.01)
USPC .............. 307/12; 307/82; 307/9.1; 307/44; 307/39; 307/80; 320/128; 320/104; 318/700; 318/701

(58) Field of Classification Search
USPC ......... 307/12, 104, 82, 18, 72, 77, 78, 43, 52, 307/53, 55, 60, 71, 62, 9.1; 320/104, 128; 318/254, 138, 439, 701, 461; 363/65, 363/67, 69, 70, 71
See application file for complete search history.

(56) References Cited

U.S. PATENT DOCUMENTS

| | | | |
|---|---|---|---|
| 7,202,619 B1 * | 4/2007 | Fisher | 318/400.29 |
| 7,638,904 B2 | 12/2009 | Shoji et al. | |
| 7,649,336 B2 | 1/2010 | Gamboa et al. | |
| 7,773,395 B2 * | 8/2010 | Siri | 363/65 |
| 7,812,575 B2 | 10/2010 | Shimada et al. | |
| 7,923,865 B2 * | 4/2011 | Melse | 307/82 |
| 8,115,446 B2 * | 2/2012 | Piccard et al. | 320/104 |
| 8,269,372 B2 * | 9/2012 | Kim et al. | 307/72 |
| 2003/0222502 A1 * | 12/2003 | Takahashi et al. | 307/18 |
| 2011/0025125 A1 * | 2/2011 | Brabec | 307/9.1 |

* cited by examiner

*Primary Examiner* — Jared Fureman
*Assistant Examiner* — Jagdeep Dhillon
(74) *Attorney, Agent, or Firm* — Eckert Seamans Cherin & Mellott, LLC; Kirk D. Houser

(57) ABSTRACT

A power flow regulator includes a plurality of bi-directional DC-DC converters, each of said converters comprising a first input, a second input, a first output and a second output; and a capacitor electrically connected between the first and second inputs of each of said converters. Either the first output of each of said converters is electrically connected to a corresponding DC source and the second output of each of said converters is electrically connected to a common DC load, or the first output of each of said converters is electrically connected to a corresponding DC load and the second output of each of said converters is electrically connected to a common DC source.

20 Claims, 6 Drawing Sheets

POWER FLOW REGULATOR INCLUDING A PLURALITY OF DC-DC CONVERTERS

BACKGROUND

1. Field

The disclosed concept pertains generally to direct current power sources and loads, and, more particularly, to power flow regulators for direct current power sources and loads.

2. Background Information

In most solar systems, for example, a relatively large number of solar strings are electrically connected in parallel, which forces all of the string voltages to be identical. However, the optimal operating voltage of each solar string might not be the same in terms of maximum power extraction. The differences between the optimal operating voltages are typically relatively small (e.g., without limitation, less than about 20 VDC). Such parallel solar strings can lower the overall system efficiency by up to about 15%.

As shown in FIG. 1, multiple parallel connected DC sources 2,4,6 are used to supply a DC load 8. One example of such a system is multiple DC solar strings supplying one DC load or supplying a DC link of a solar inverter.

Similarly, one DC source 10 can supply multiple DC loads 12,14,16 as shown in FIG. 2. One example is that one DC source can charge multiple parallel connected batteries.

Combining FIGS. 1 and 2 together, multiple DC sources 18,20,22 can supply multiple DC loads 24,26,28 as shown in FIG. 3.

When the multiple parallel connected DC sources 2,4,6 supply the DC load 8 of FIG. 1, in some cases, a DC source's output power is determined by its DC voltage, such as the voltage of a solar panel (string). In FIG. 1, the source voltages of the DC sources 2,4,6 are always equal to the load voltage of the DC load 8. The output power of the individual DC sources 2,4,6 is determined by the DC load voltage. It is impossible to change DC power distribution among the DC sources 2,4,6 since this is solely determined by load voltage.

When the multiple parallel connected DC loads 12,14,16 are supplied by the DC source 10 of FIG. 2, in some cases, a DC load's power is determined by its DC voltage. In FIG. 2, the load voltages of the DC loads 12,14,16 are always equal to the source voltage of the DC source 10. The consumed power of the individual DC loads 12,14,16 is determined by the DC source voltage. It is impossible to change DC power distribution among the DC loads 12,14,16 since this is solely determined by source voltage.

When the multiple parallel connected DC sources 18,20,22 supply the multiple DC loads 24,26,28 of FIG. 3, if a DC source's output power is determined by its DC voltage, it is impossible to change DC power distribution among the DC sources 18,20,22 since this is solely determined by load voltage. If a DC load's power is determined by its DC voltage, then it is impossible to change DC power distribution among the DC loads 24,26,28 since this is solely determined by source voltage.

There is room for improvement in power flow regulators.

SUMMARY

These needs and others are met by embodiments of the disclosed concept, which regulate power flows among a plurality of DC power sources and/or a plurality of DC loads.

In accordance with one aspect of the disclosed concept, a power flow regulator comprises: a plurality of bi-directional DC-DC converters, each of the converters comprising a first input, a second input, a first output and a second output; and a capacitor electrically connected between the first and second inputs of each of the converters, wherein either: the first output of each of the converters is electrically connected to a corresponding DC source and the second output of each of the converters is electrically connected to a common DC load, or the first output of each of the converters is electrically connected to a corresponding DC load and the second output of each of the converters is electrically connected to a common DC source.

The plurality of bi-directional DC-DC converters may be a first plurality of bi-directional DC-DC converters; the capacitor may be a first capacitor; and the common DC load may comprise: a second plurality of bi-directional DC-DC converters, each of the second plurality of bi-directional DC-DC converters may comprise a first input, a second input, a first output and a second output; and a second capacitor electrically connected between the first and second inputs of each of the second plurality of bi-directional DC-DC converters, wherein the first output of each of the second plurality of bi-directional DC-DC converters may be electrically connected to the second output of each of the first plurality of bi-directional DC-DC converters, and wherein the second output of each of the second plurality of bi-directional DC-DC converters may be electrically connected to a corresponding DC load.

The plurality of bi-directional DC-DC converters may be a first plurality of bi-directional DC-DC converters; the capacitor may be a first capacitor; and the common DC source may comprise: a second plurality of bi-directional DC-DC converters, each of the second plurality of bi-directional DC-DC converters may comprise a first input, a second input, a first output and a second output; and a second capacitor electrically connected between the first and second inputs of each of the second plurality of bi-directional DC-DC converters, wherein the first output of each of the second plurality of bi-directional DC-DC converters may be electrically connected to a corresponding DC source, and wherein the second output of each of the second plurality of bi-directional DC-DC converters may be electrically connected to the first output of each of the first plurality of bi-directional DC-DC converters.

As another aspect of the disclosed concept, a power flow regulator comprises: a plurality of mono-directional DC-DC converters, each of the converters comprising a first input, a second input, a first output and a second output; and a capacitor electrically connected between the first and second inputs of each of the converters, wherein either: the first output of each of the converters is electrically connected to a corresponding DC source having a common ground, the second output is electrically connected to the second input of each of the converters, and a common DC load is electrically connected between the first input of each of the converters and the common ground, or the second output of each of the converters is electrically connected to a corresponding DC load having a common ground, the first output is electrically connected to the second input of each of the converters, and a common DC source is electrically connected between the first input of each of the converters and the common ground.

The plurality of mono-directional DC-DC converters may be a first plurality of mono-directional DC-DC converters; the capacitor may be a first capacitor; and the common DC load may comprise: a second plurality of mono-directional DC-DC converters, each of the second plurality of mono-directional DC-DC converters may comprise a first input, a second input, a first output and a second output; and a second capacitor electrically connected between the first and second inputs of each of the second plurality of mono-directional DC-DC converters, wherein the first input of each of the second plurality of mono-directional DC-DC converters may be electrically connected to the first input of each of the first plurality of mono-directional DC-DC converters, wherein the first output of each of the second plurality of mono-directional DC-DC converters may be electrically connected to the second input of each of the second plurality of mono-directional DC-DC converters, and wherein the second output of each of the second plurality of mono-directional DC-DC converters may be electrically connected to a corresponding DC load.

The plurality of mono-directional DC-DC converters may be a first plurality of mono-directional DC-DC converters; the capacitor may be a first capacitor; and the common DC source may comprise: a second plurality of mono-directional DC-DC converters, each of the second plurality of mono-directional DC-DC converters may comprise a first input, a second input, a first output and a second output; and a second capacitor electrically connected between the first and second inputs of each of the second plurality of mono-directional DC-DC converters, wherein the first input of each of the second plurality of mono-directional DC-DC converters may be electrically connected to the first input of each of the first plurality of mono-directional DC-DC converters, wherein the first output of each of the second plurality of mono-directional DC-DC converters may be electrically connected to a corresponding DC source, and wherein the second output of each of the second plurality of mono-directional DC-DC converters may be electrically connected to the second input of each of the second plurality of mono-directional DC-DC converters.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the term "DC-to-DC converter" (or "DC-DC converter") shall mean a circuit that converts a source of direct current (DC) from one voltage level to another voltage level.

As employed herein, the term "bi-directional DC-to-DC converter" (or "bi-directional DC-DC converter") shall mean a DC-to-DC converter (or DC-DC converter) that can move power in either direction (e.g., from its input to its output, and from its output to its input).

As employed herein, the term "mono-directional DC-to-DC converter" (or "mono-directional DC-DC converter") shall mean a DC-to-DC converter (or DC-DC converter) that can move power in one direction (e.g., either from its input to its output, or from its output to its input).

As employed herein, the term "bi-directional delta DC-DC converter" shall mean a bi-directional DC-to-DC converter (or bi-directional DC-DC converter) that, for example, if the bi-directional delta DC-DC converter directly supplies a DC load, then the DC voltage of the DC load is the corresponding DC source voltage plus or minus the output voltage of the converter, or, for example, if the bi-directional delta DC-DC converter directly supplies a corresponding DC load, then the DC voltage of the corresponding DC load is the DC source voltage plus or minus the output voltage of the converter.

As employed herein, the term "mono-directional delta DC-DC converter" shall mean a mono-directional DC-to-DC converter (or mono-directional DC-DC converter) that, for example, if the mono-directional delta DC-DC converter directly supplies a DC load, then the DC voltage of the DC load is the corresponding DC source voltage plus or minus the output voltage of the converter, or, for example, if the mono-directional delta DC-DC converter directly supplies a corresponding DC load, then the DC voltage of the corresponding DC load is the DC source voltage plus or minus the output voltage of the converter.

As employed herein, the statement that two or more parts are "connected" or "coupled" together shall mean that the parts are joined together either directly or joined through one or more intermediate parts. Further, as employed herein, the statement that two or more parts are "attached" shall mean that the parts are joined together directly.

The disclosed concept is applicable to a wide range of power flow regulators including a plurality of delta DC-DC converters.

Figure 1:
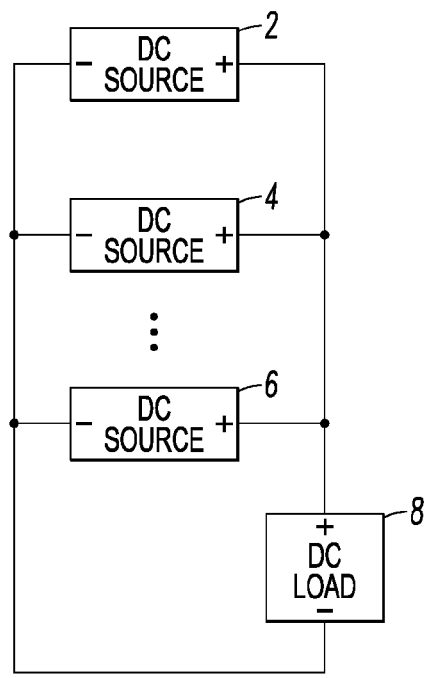
FIG. 1 is a block diagram in schematic form of multiple parallel connected DC sources supplying one DC load.
Figure 2:
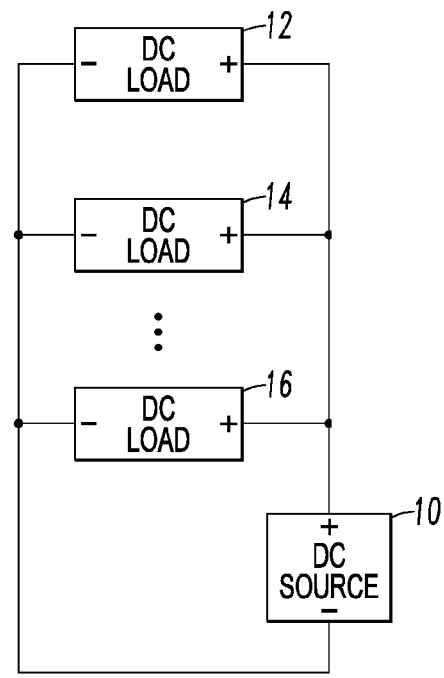
FIG. 2 is a block diagram in schematic form of one DC source supplying multiple parallel connected DC loads.
Figure 3:
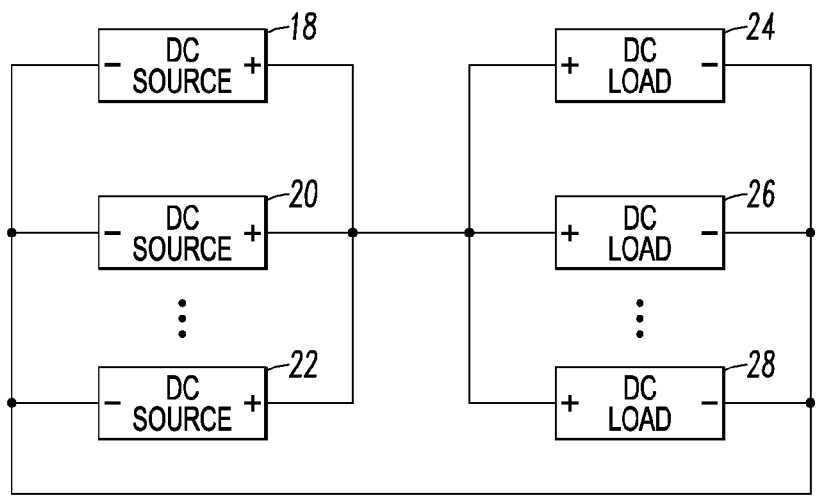
FIG. 3 is a block diagram in schematic form of multiple parallel connected DC sources supplying multiple parallel connected DC loads.
Figure 4:
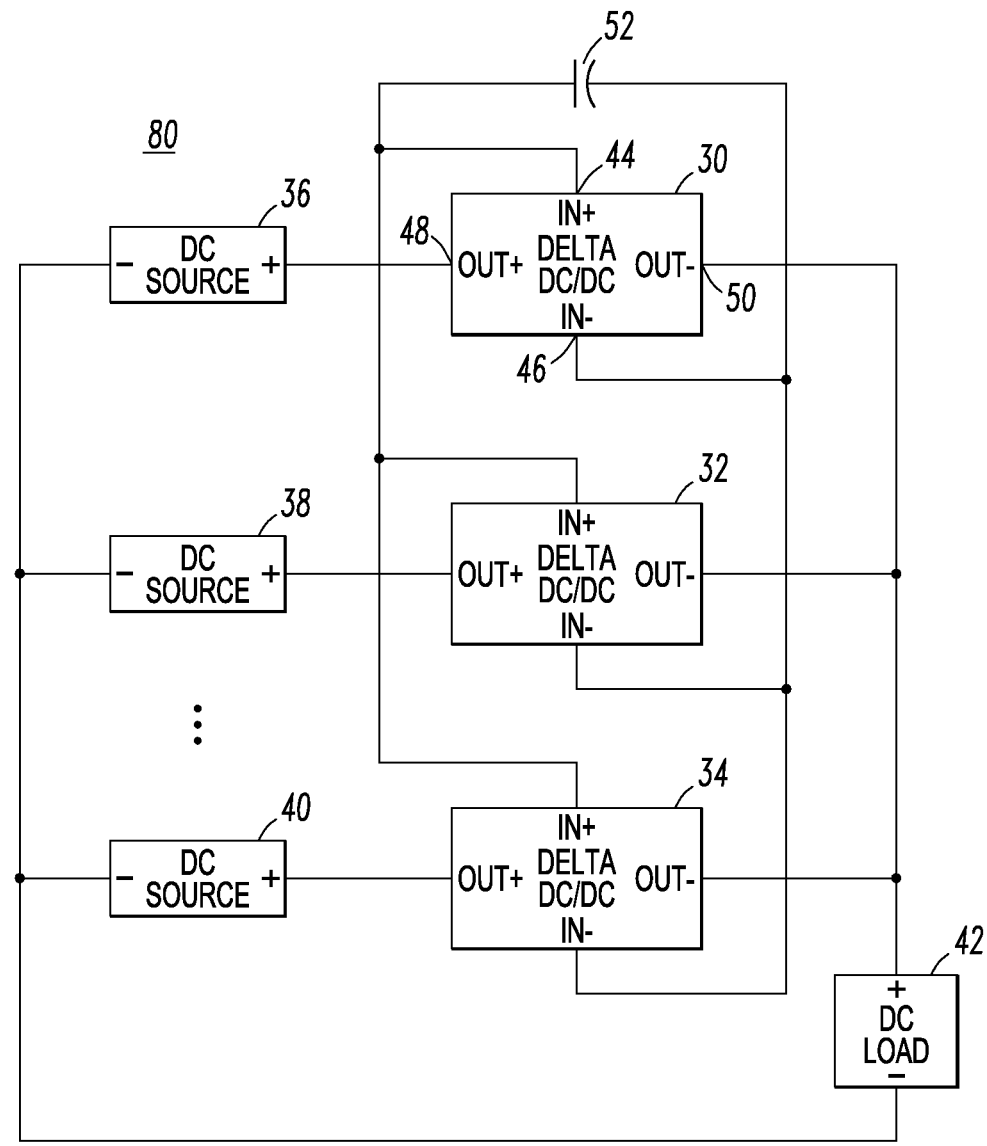
FIGS. 4-9 are block diagrams in schematic form of power flow regulators in accordance with embodiments of the disclosed concept.

Referring to FIG. 4, delta DC-DC converters 30,32,34 with a bi-directional output voltage are employed for multiple parallel connected DC sources 36,38,40 to supply a DC load 42. As employed in connection with FIG. 4:

VS is DC source output voltage;
IS is DC source output current;
PS is DC source output power;
VI is input voltage of the delta DC-DC converter;
VO is output voltage of the delta DC-DC converter;
PI is input power of the delta DC-DC converter;
PO is output power of delta DC-DC converter; and
VL is load voltage.

The output power of a DC source is determined by its voltage, that is:

$$PS=f(VS)$$

The DC source voltage is:

$$VS=VL-VO$$

Hence:

$$PS=f(VL-VO)$$

That is, the output power of individual DC sources 36,38, 40 can be regulated by controlling the output voltage of the delta DC-DC converters 30,32,34, VO. The power absorbed by each delta DC-DC converter is:

$$PO=IS*VO$$

To be simplified, the efficiency of each delta DC-DC converter is 100%. Thus, PO=PI. The typical efficiency of the delta DC-DC converters 30,32,34 is about 89% to about 95%. There is no impact to the overall analysis when the efficiency is less than 100%.

A bi-directional output voltage DC-DC converter (or bi-directional DC-DC converter) is a known device. Basically, the DC-DC converter has an input 44,46 in which the voltage is mono-directional and the current is bi-directional, and an output 48,50 in which the voltage is bi-directional and the current is mono-directional. There are a wide range of implementations of this DC-DC converter. If the output power is bi-directional, then the DC-DC converter is bi-directional.

As shown in FIG. 4, all inputs 44,46 of the delta DC-DC converters 30,32,34 are connected to a common DC capacitor 52. The voltage of the DC capacitor 52 is intentionally controlled to be a constant voltage. Thus:

$$P_{I,1} + P_{I,2} + \ldots + P_{I,N} = 0$$

wherein:

$P_{I,j}$ is input power of the jth delta DC-DC converter; and j is a positive integer representing one of the plurality of delta DC-DC converters, such as 30, 32 and 34.

In short, if the output power of a DC source (e.g., 36, 38 or 40) is determined by its DC voltage, then the DC source output power can be regulated by the output voltage of the delta DC-DC converter (e.g., 30, 32 or 34). All inputs 44,46 of the delta DC-DC converters 30,32,34 are connected to the common DC capacitor 52 without additional DC sources. Also, additional power sources or loads (not shown) might be connected in parallel to the DC capacitor 52 in FIG. 4. Thus, the energy drawn from the system could supply an external load (not shown), or external power sources (not shown) can inject the energy to the system.

Figure 5:
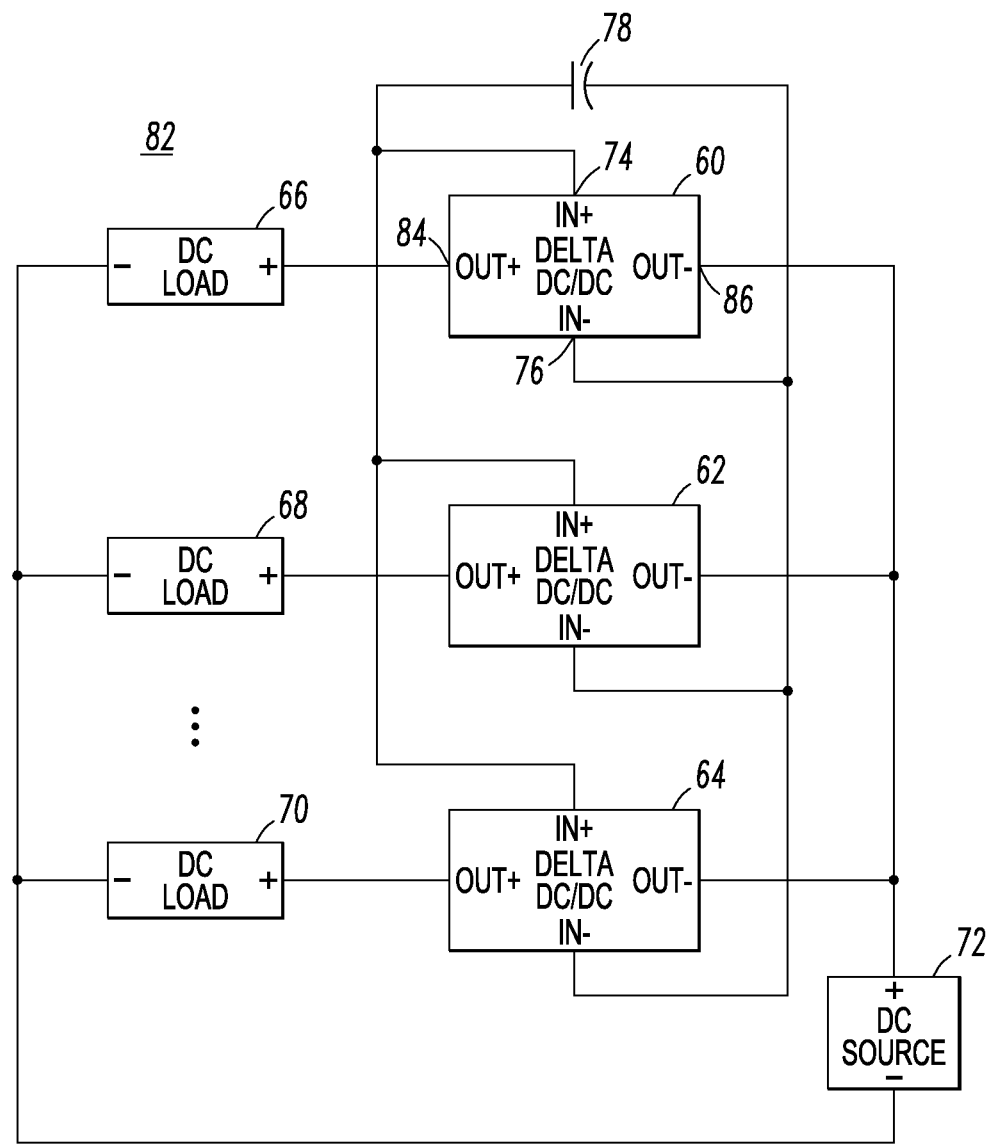

As shown in FIG. 5, delta DC-DC converters 60,62,64 with a bi-directional output voltage are employed for multiple parallel connected DC loads 66,68,70 supplied by a DC source 72. If the consumed power of the DC loads 66,68,70 is determined by the DC voltage, then the DC load power consumption can be regulated by the output voltage of each delta DC-DC converter 60,62,64. All inputs 74,76 of the delta DC-DC converters 60,62,64 are connected to a common DC capacitor 78 without additional DC sources. Also, additional power sources or loads (not shown) might be connected in parallel to the DC capacitor 78 in FIG. 5. Thus, the energy drawn from the system could supply an external load (not shown), or external power sources (not shown) can inject the energy to the system.

As shown in FIGS. 4 and 5, each of the respective power flow regulators 80; 82 includes a plurality of bi-directional delta DC-DC converters 30,32,34; 60,62,64 each of which includes a first input 44; 74, a second input 46; 76, a first output 48; 84 and a second output 50; 86, respectively. The capacitor 52; 78 is electrically connected between the first and second inputs 44,46; 74,76 of each of the converters 30,32,34; 60,62,64, respectively. As shown in FIG. 4, the first output 48 of each of the converters 30,32,34 is electrically connected to the corresponding DC source 36,38,40 and the second output 50 of each of the converters 30,32,34 is electrically connected to the common DC load 42. As shown in FIG. 5, the first output 84 of each of the converters 60,62,64 is electrically connected to the corresponding DC load 66,68,70 and the second output 86 of each of the converters 60,62,64 is electrically connected to the common DC source 72.

Example 1

In FIGS. 4 and 5, the bi-directional delta DC-DC converters 30,32,34; 60,62,64 have galvanic isolation between the first and second outputs 48,50; 84,86 and the first and second inputs 44,46; 74,76, respectively.

Example 2

In FIGS. 4 and 5, the bi-directional delta DC-DC converters 30,32,34; 60,62,64 have no galvanic isolation between the first and second outputs 48,50; 84,86 and the first and second inputs 44,46; 74,76, respectively.

Example 3

In FIGS. 4 and 5, a positive voltage is between the first and second outputs 48,50; 84,86 of a number of the bi-directional delta DC-DC converters 30,32,34; 60,62,64, respectively. However, the output voltage of each converter 30,32,34; 60,62,64 cannot always be positive; a number of output voltages are positive and a number of output voltages are negative.

Example 4

In FIGS. 4 and 5, a negative voltage is between the first and second outputs 48,50; 84,86 of a number of the bi-directional delta DC-DC converters 30,32,34; 60,62,64, respectively.

Example 5

In FIGS. 4 and 5, a positive constant DC voltage is across the capacitor 52,78 between the first and second inputs 44,46; 74,76 of each of the bi-directional delta DC-DC converters 30,32,34; 60,62,64, respectively.

Figure 6:
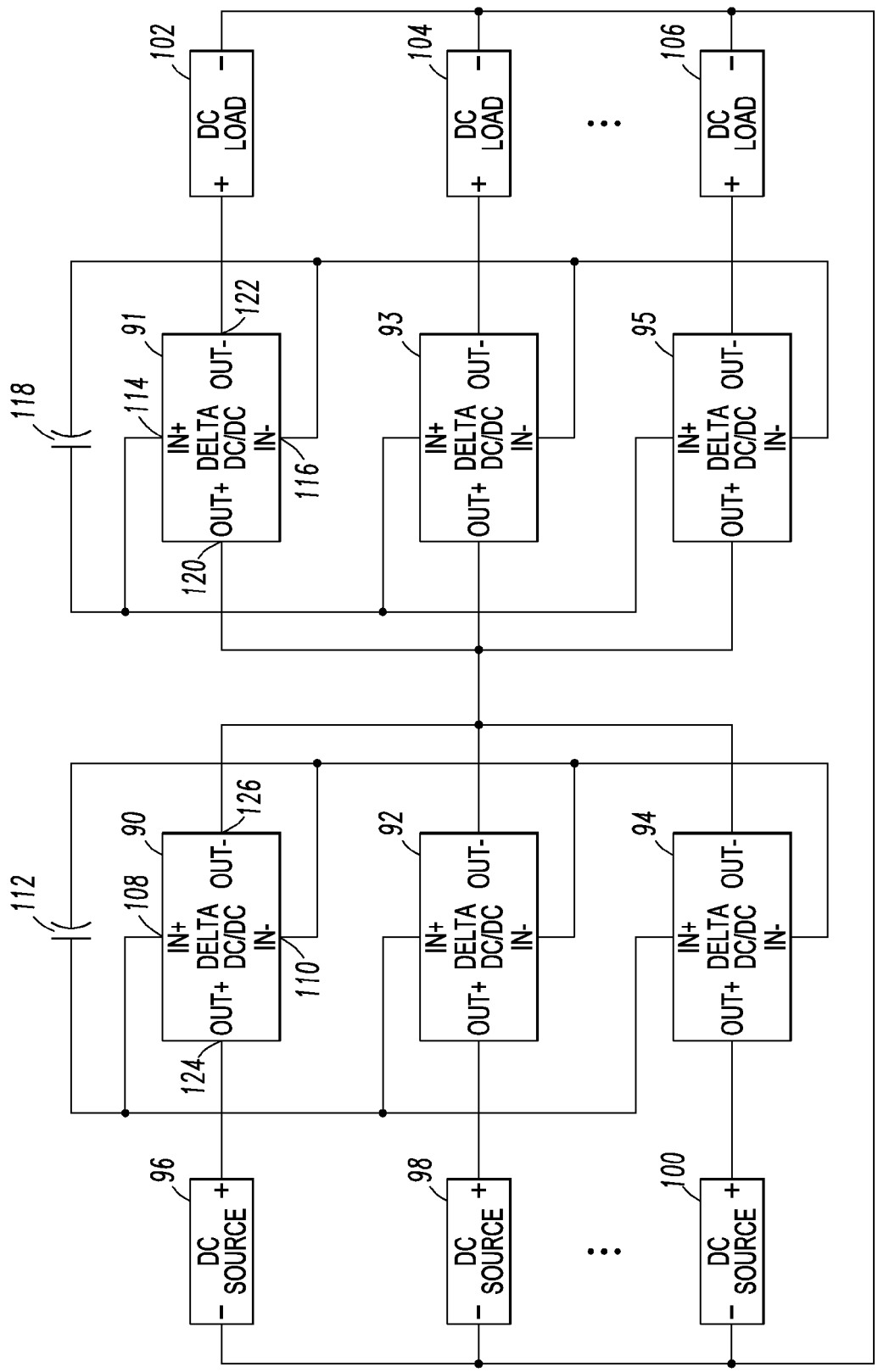

Referring to FIG. 6, DC-DC converters 90,91,92,93,94,95 with a bi-directional output voltage are employed for multiple parallel connected DC sources 96,98,100 to supply multiple DC loads 102,104,106, as will be discussed. If the output power of the DC source 96,98,100 is determined by its DC voltage, then the DC source output power can be regulated by the output voltage of the delta DC-DC converters 90,92,94. All inputs 108,110 of the delta DC-DC converters 90,92,94 are connected to a common DC capacitor 112 without additional DC sources (not shown). If the consumed power of the DC load 102,104,106 is determined by its DC voltage, then the DC load power consumption can be regulated by the output voltage of the delta DC-DC converters 91,93,95. All inputs 114,116 of the delta DC-DC converters 91,93,95 are connected to a common DC capacitor 118 without additional DC sources (not shown). Also, additional power sources or loads (not shown) might be connected in parallel to the DC capacitors 112,118 in FIG. 6. Thus, the energy drawn from the system could supply an external load (not shown), or external power sources (not shown) can inject the energy to the system.

Example 6

In FIGS. 4-6, a delta DC-DC converter with bi-directional output voltage has the following characteristics: (1) the input and output can employ galvanic isolation or not, although galvanic isolation is preferred; (2) the input is a positive constant voltage; and (3) the output voltage can be positive or negative.

Example 7

In FIG. 6, there is no source for the "input" (In + and In−); this is a function of the bi-directional output voltage delta DC-DC converters 90,91,92,93,94,95. For a delta DC-DC converter, the input power is equal to the output power if the power loss is ignored. In FIG. 6, for example, if the output power of delta DC-DC converter 90 is 10 W, and that of delta DC-DC converter 92 is 6 W, and that of delta DC-DC converter 94 is −16 W, then the input powers of delta DC-DC converters 90,92,94 are 10 W, 6 W and −16 W, respectively.

For the capacitor 112, total power flowing into that capacitor would be 10 W+6 W−16 W=0 W. Thus, capacitor voltage will be kept constant. If it is not 0 W, and is, for example, 1 W, then the capacitor voltage will increase. By regulating the output voltages of the delta DC-DC converters 90,92,94, the input power of the capacitor 112 is changed, and the capacitor voltage is regulated.

Example 8

Referring to FIGS. 4 and 6, the common DC load 42 of FIG. 4 can be formed from a circuit of FIG. 6 including the plurality of bi-directional delta DC-DC converters 91,93,95, each of which includes the first input 114, the second input 116, a first output 120 and a second output 122, and this circuit also includes the capacitor 118 electrically connected between the first and second inputs 114,116 of each of the bi-directional delta DC-DC converters 91,93,95. The first output 120 of each of the bi-directional delta DC-DC converters 91,93,95 is electrically connected to the second output 126 of each of the bi-directional delta DC-DC converters 90,92,94. The second output 122 of each of the bi-directional delta DC-DC converters 91,93,95 is electrically connected to a corresponding DC load 102,104,106.

Example 9

Referring to FIGS. 5 and 6, the common DC source 72 of FIG. 5 can be formed from a circuit of FIG. 6 including the plurality of bi-directional delta DC-DC converters 90,92,94, each of which includes the first input 108, the second input 110, a first output 124 and a second output 126, and this circuit also includes the capacitor 112 electrically connected between the first and second inputs 108,110 of each of the bi-directional delta DC-DC converters 90,92,94. The first output 124 of each of the bi-directional delta DC-DC converters 90,92,94 is electrically connected to the corresponding DC source 96,98,100. The second output 126 of each of the bi-directional delta DC-DC converters 90,92,94 is electrically connected to the first output 120 of each of the bi-directional delta DC-DC converters 91,93,95.

Figure 7:
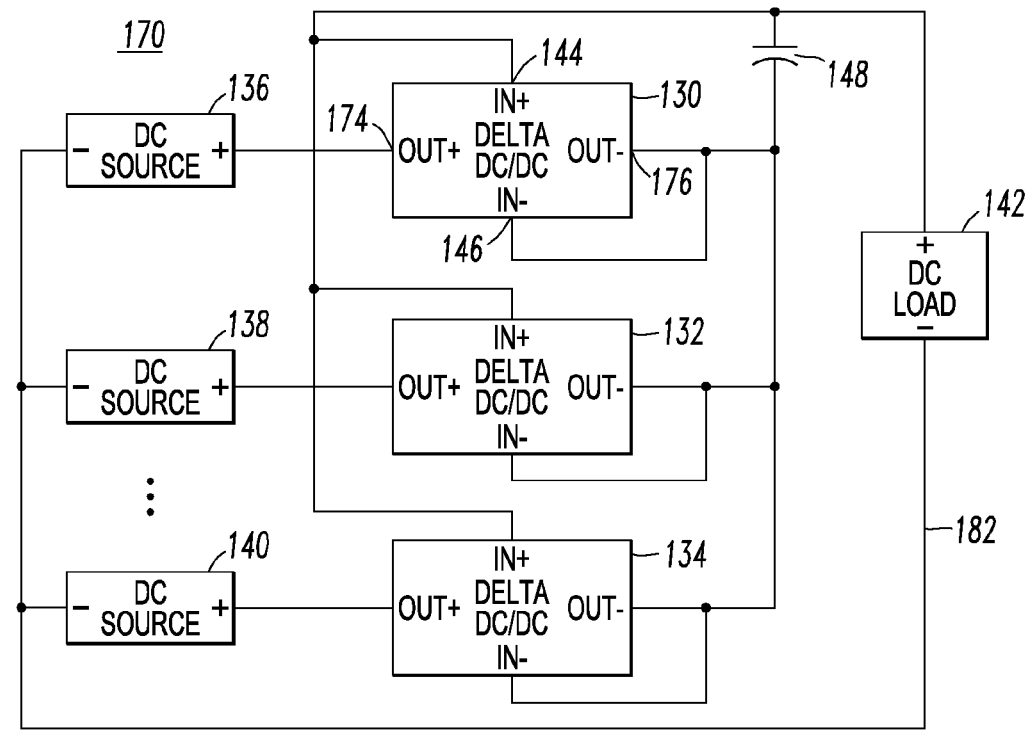
Figure 8:
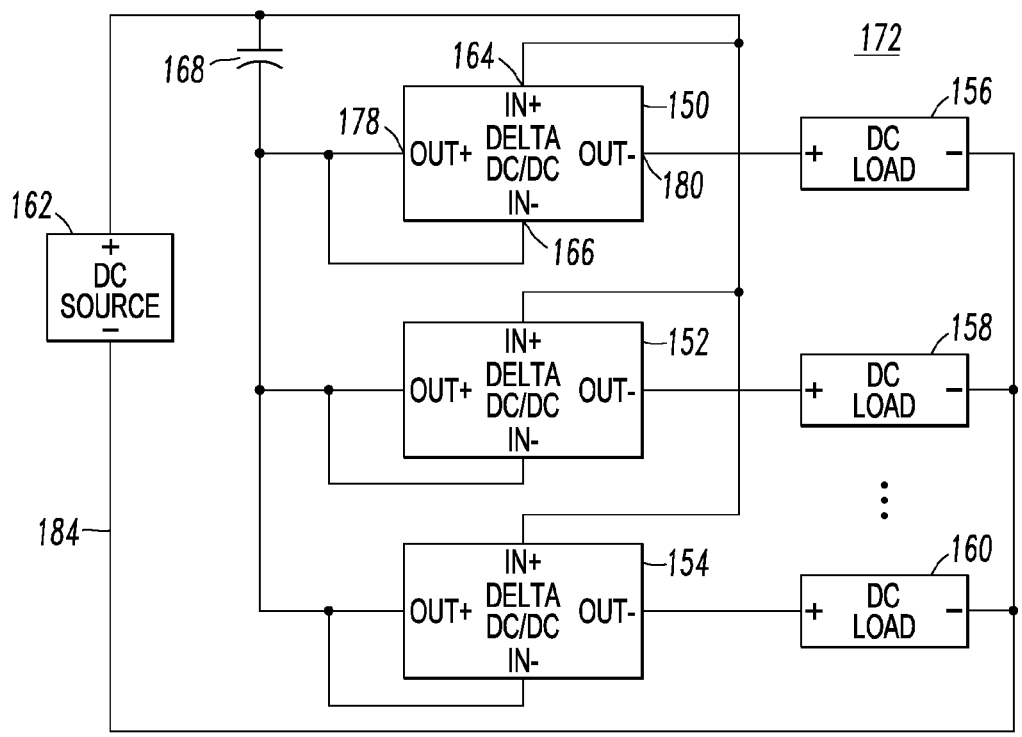
Figure 9:
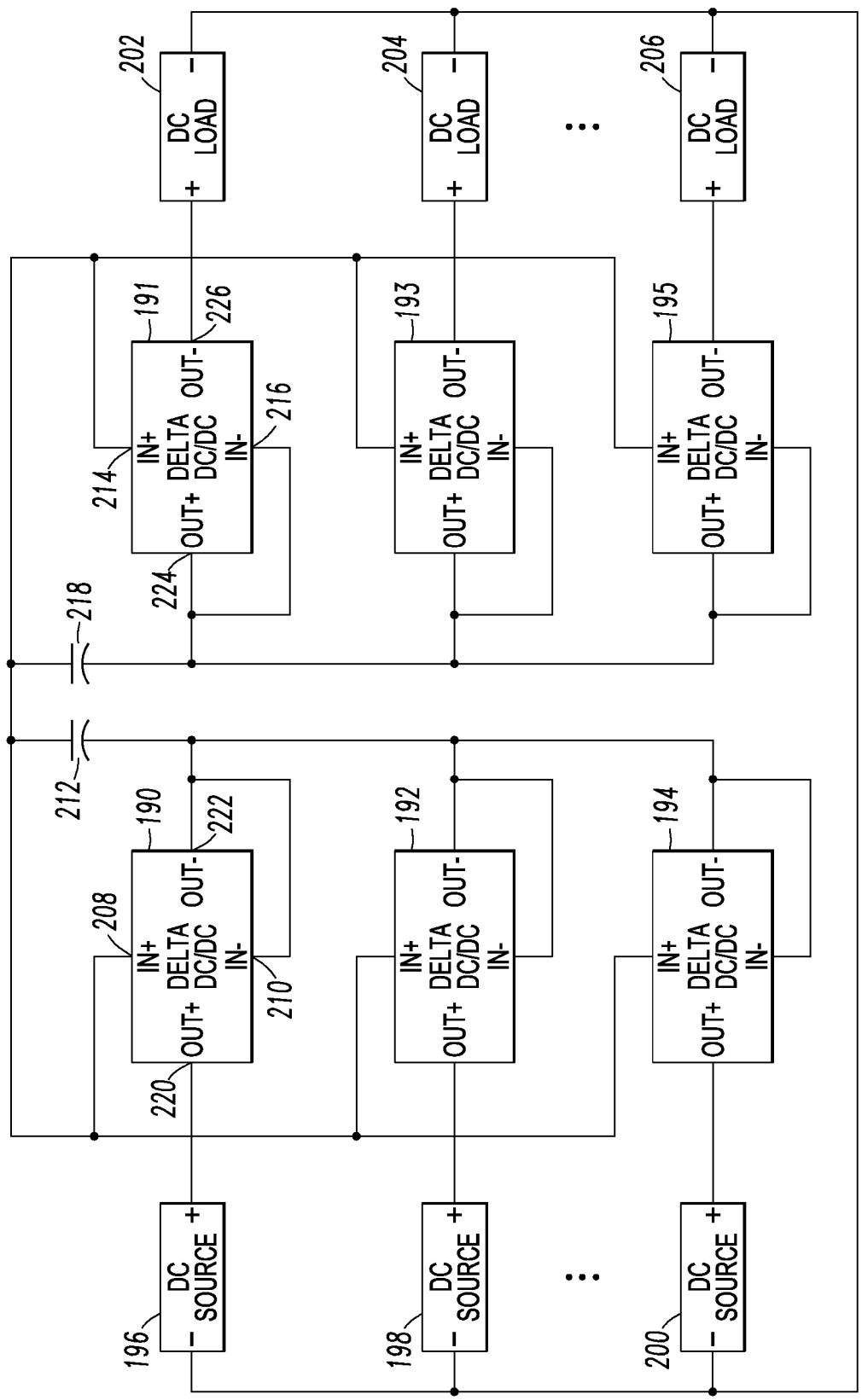

FIGS. 7-9 employ DC-DC converters with a mono-directional output voltage. A mono-directional output voltage DC-DC converter is a known device. Basically, this DC-DC converter has an input in which the voltage is mono-directional and the current is mono-directional, and has an output in which the voltage is mono-directional and the current is mono-directional. There are a wide range of implementations of this DC-DC converter. If the output power is mono-directional, then the DC-DC converter is mono-directional.

Referring to FIG. 7, delta DC-DC converters 130,132,134 with a mono-directional output voltage are employed for multiple parallel connected DC sources 136,138,140 to supply a DC load 142.

The output power of a DC source 136,138,140 is determined by its voltage, that is:

$$PS=f(VS)$$

The DC source voltage is:

$$VS=VL-VO-VI$$

So:

$$PS=f(VL-VO-VI)$$

The input voltage of the delta DC-DC converter, VI, is controlled to be a positive constant value. Thus, the output power of individual DC sources 136,138,140 can be regulated by controlling output voltage of the delta DC-DC converters 130,132,134, VO. The power absorbed by the delta DC-DC converters 130,132,134 is:

$$PO=IS*VO$$

To be simplified, the efficiency of the delta DC-DC converters 130,132,134 is 100%. Thus, PO=PI. As shown in FIG. 7, all inputs 144,146 of the delta DC-DC converters 130,132,134 are connected to a common DC capacitor 148. The voltage of the DC capacitor 148 is intentionally controlled to be a constant voltage. Thus:

$$P_{I,1}+P_{I,2}+\ldots+P_{I,N}=VI*IL$$

wherein:

IL is load current.

Also, if the efficiency is 100%, then:

$$P_{I,1}+P_{I,2}+\ldots+P_{I,N}=VI*IL=P_{O,1}+P_{O,2}+\ldots+P_{O,N}$$

In short, if the output power of a DC source 136,138,140 is determined by its DC voltage, then the DC source output power can be regulated by the output voltage of the delta DC-DC converters 130,132,134. All inputs 144,146 of the delta DC-DC converters 130,132,134 are connected to the common DC capacitor 148.

Example 10

FIG. 7 uses mono-directional output voltage delta DC-DC converters 130,132,134. There is no source for the "input" (In + and In−), which is a positive constant voltage. This is a function of the mono-directional output voltage delta DC-DC converters 130,132,134.

As shown in FIG. 8, delta DC-DC converters 150,152,154 with a mono-directional output voltage are employed for multiple parallel connected DC loads 156,158,160 supplied by a DC source 162. If the consumed power of the DC loads 156,158,160 is determined by the DC voltage, then the DC load power consumption can be regulated by the output voltage of the delta DC-DC converters 150,152,154. All inputs 164,166 of the delta DC-DC converters 150,152,154 are connected to a common DC capacitor 168 which provides part of the DC source voltage.

Referring to FIGS. 7 and 8, power flow regulators 170,172 include a plurality of mono-directional delta DC-DC converters 130,132,134; 150,152,154, each of which includes the first input 144; 164, a second input 146; 166, a first output 174; 178 and a second output 176; 180, respectively. The capacitor 148; 168 is electrically connected between the first and second inputs 144,146; 164,166 of each of the delta DC-DC converters 130,132,134; 150,152,154, respectively.

As shown in FIG. 7, the first output 174 of each of the delta DC-DC converters 130,132,134 is electrically connected to the corresponding DC source 136,138,140 having a common ground 182. The second output 176 is electrically connected to the second input 146 of each of the delta DC-DC converters 130,132,134. The common DC load 142 is electrically connected between the first input 144 of each of the delta DC-DC converters 130,132,134 and the common ground 182.

As shown in FIG. 8, the second output 180 of each of the delta DC-DC converters 150,152,154 is electrically connected to the corresponding DC load 156,158,160 having a common ground 184. The first output 178 is electrically connected to the second input 166 of each of the delta DC-DC converters 150,152,154. The common DC source 162 is electrically connected between the first input 164 of each of the delta DC-DC converters 150,152,154 and the common ground 184.

Example 11

In FIGS. 7 and 8, the mono-directional delta DC-DC converters 130,132,134; 150,152,154 have galvanic isolation between the first and second outputs 174,176; 178; 180 and the first and second inputs 144,146; 164,166, respectively.

Example 12

In FIGS. 7 and 8, the mono-directional delta DC-DC converters 130,132,134; 150,152,154 have no galvanic isolation between the first and second outputs 174,176; 178; 180 and the first and second inputs 144,146; 164,166, respectively.

Example 13

In FIGS. 7 and 8, a positive voltage is between the first and second outputs 174,176; 178,180 of each of the mono-directional delta DC-DC converters 130,132,134; 150,152,154, respectively.

Example 14

In FIGS. 7 and 8, a negative constant DC voltage is across the capacitor 148; 168 between the first and second inputs 144,146; 164,166 of each of the mono-directional delta DC-DC converters 130,132,134; 150,152,154, respectively. A negative voltage is between the first and second outputs 174,176; 178,180 of each of the mono-directional delta DC-DC converters 130,132,134; 150,152,154, respectively.

Example 15

In FIGS. 7 and 8, a positive constant DC voltage is across the capacitor 148; 168 between the first and second inputs 144,146; 164,166 of each of the mono-directional delta DC-DC converters 130,132,134; 150,152,154, respectively.

Referring to FIG. 9, delta DC-DC converters 190,191,192, 193, 194,195 with a mono-directional output voltage are employed for multiple parallel connected DC sources 196, 198,200 to supply multiple DC loads 202,204,206. If the output power of a DC source 196,198,200 is determined by its DC voltage, then the DC source output power can be regulated by the output voltage of the delta DC-DC converters 190,192,194. All inputs 208,210 of the delta DC-DC converters 190,192,194 are connected to a common DC capacitor 212. If the consumed power of the DC loads 202,204,206 is determined by the DC voltage, then the DC load power consumption can be regulated by the output voltage of the delta DC-DC converters 191,193,195. All inputs 214,216 of the delta DC-DC converters 191,193,195 are connected to a common DC capacitor 218.

Example 16

The delta DC-DC converters 190,191,192,193,194,195 have the following characteristics: (1) the input (In + and In−) 208,210; 214,216 and output (Out+ and Out−) 220,222; 224, 226 can employ galvanic isolation or not, although galvanic isolation is preferred; (2) the input is a positive constant voltage; and the output voltage could be a variable positive voltage. If the input of the delta DC-DC converters 190,191, 192,193,194,195 is a negative constant voltage, then the output voltage is preferably a variable negative voltage.

Example 17

In FIG. 9, there is no source for the "input" (In + and In−) which has a "positive constant voltage" or a "negative constant voltage". This is a function of the mono-directional output voltage delta DC-DC converters 190,191,192,193,194,195 by controlling the output voltage thereof. Here, the input voltage is mono-directional.

Example 18

Referring to FIGS. 7 and 9, the common DC load 142 of FIG. 7 can be provided by the plurality of mono-directional delta DC-DC converters 191,193,195 of FIG. 9, each of which includes the first input 214, the second input 216, the first output 224 and the second output 226. Also, the capacitor 218 is electrically connected between the first and second inputs 214,216 of each of the delta DC-DC converters 191, 193,195. The first input 214 of each of the delta DC-DC converters 191,193,195 is electrically connected to the first input 208 of each of the delta DC-DC converters 190,192, 194. The first output 224 of each of the delta DC-DC converters 191,193,195 is electrically connected to the second input 216 of each of the delta DC-DC converters 191,193,195. The second output 226 of each of the delta DC-DC converters 191,193,195 is electrically connected to the corresponding DC load 202,204,206.

Example 19

Referring to FIGS. 8 and 9, the common DC source 162 of FIG. 8 can be provided by the plurality of mono-directional delta DC-DC converters 190,192,194 of FIG. 9, each of which include the first input 208, the second input 210, the first output 220 and the second output 222. Also, the capacitor 212 is electrically connected between the first and second inputs 208,210 of each of the mono-directional delta DC-DC converters 190,192,194. The first input 214 of each of the mono-directional delta DC-DC converters 191,193,195 is electrically connected to the first input 208 of each of the mono-directional delta DC-DC converter 190,192,194. The first output 220 of each of the mono-directional delta DC-DC converters 190,192,194 is electrically connected to the corresponding DC source 196,198,200. The second output 222 of each of the mono-directional delta DC-DC converters 190, 192,194 is electrically connected to the second input 210 of each of the mono-directional delta DC-DC converters 190, 192,194.

Example 20

Referring again to FIGS. 4-6, the input voltage is mono-directional and the current is bi-directional. The output voltage is bi-directional and the current is mono-directional.

Example 21

Referring again to FIGS. 7-9, the input voltage is mono-directional, and the current is mono-directional. The output voltage is mono-directional and the current is mono-directional.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A power flow regulator comprising:
   a plurality of bi-directional DC-DC converters, each of said converters comprising a first input, a second input, a first output and a second output; and
   a capacitor electrically connected between the first and second inputs of each of said converters,
   wherein either:
      the first output of each of said converters is electrically connected to a corresponding DC source and the second output of each of said converters is electrically connected to a common DC load, or
      the first output of each of said converters is electrically connected to a corresponding DC load and the second output of each of said converters is electrically connected to a common DC source.

2. The power flow regulator of claim 1 wherein the first output of each of said converters is electrically connected to the corresponding DC source and the second output of each of said converters is electrically connected to the common DC load.

3. The power flow regulator of claim 1 wherein the first output of each of said converters is electrically connected to the corresponding DC load and the second output of each of said converters is electrically connected to the common DC source.

4. The power flow regulator of claim 1 wherein said plurality of bi-directional DC-DC converters are a first plurality of bi-directional DC-DC converters;
   wherein said capacitor is a first capacitor; and wherein said common DC load comprises:
      a second plurality of bi-directional DC-DC converters, each of said second plurality of bi-directional DC-DC converters comprising a first input, a second input, a first output and a second output; and
      a second capacitor electrically connected between the first and second inputs of each of said second plurality of bi-directional DC-DC converters,
      wherein the first output of each of said second plurality of bi-directional DC-DC converters is electrically connected to the second output of each of said first plurality of bi-directional DC-DC converters, and
      wherein the second output of each of said second plurality of bi-directional DC-DC converters is electrically connected to a corresponding DC load.

5. The power flow regulator of claim 1 wherein said plurality of bi-directional DC-DC converters are a first plurality of bi-directional DC-DC converters;
   wherein said capacitor is a first capacitor; and wherein said common DC source comprises:
      a second plurality of bi-directional DC-DC converters, each of said second plurality of bi-directional DC-DC converters comprising a first input, a second input, a first output and a second output; and
      a second capacitor electrically connected between the first and second inputs of each of said second plurality of bi-directional DC-DC converters,
      wherein the first output of each of said second plurality of bi-directional DC-DC converters is electrically connected to a corresponding DC source, and
      wherein the second output of each of said second plurality of bi-directional DC-DC converters is electrically connected to the first output of each of said first plurality of bi-directional DC-DC converters.

6. The power flow regulator of claim 1 wherein said converters further comprise galvanic isolation between the first and second outputs and the first and second inputs.

7. The power flow regulator of claim 1 wherein said converters further comprise no galvanic isolation between the first and second outputs and the first and second inputs.

8. The power flow regulator of claim 1 wherein a positive constant DC voltage is across the capacitor between the first and second inputs of each of said converters.

9. The power flow regulator of claim 1 wherein a positive voltage is between the first and second outputs of a number of said converters.

10. The power flow regulator of claim 1 wherein a negative voltage is between the first and second outputs of a number of said converters.

11. A power flow regulator comprising:
    a plurality of mono-directional DC-DC converters, each of said converters comprising a first input, a second input, a first output and a second output; and
    a capacitor electrically connected between the first and second inputs of each of said converters,
    wherein either:
       the first output of each of said converters is electrically connected to a corresponding DC source having a common ground, the second output is electrically connected to the second input of each of said converters, and a common DC load is electrically connected between the first input of each of said converters and the common ground, or
       the second output of each of said converters is electrically connected to a corresponding DC load having a common ground, the first output is electrically connected to the second input of each of said converters, and a common DC source is electrically connected between the first input of each of said converters and the common ground.

12. The power flow regulator of claim 11 wherein the first output of each of said converters is electrically connected to the corresponding DC source having the common ground, the second output is electrically connected to the second input of each of said converters, and the common DC load is electrically connected between the first input of each of said converters and the common ground.

13. The power flow regulator of claim 11 wherein the second output of each of said converters is electrically connected to the corresponding DC load having the common ground, the first output is electrically connected to the second input of each of said converters, and the common DC source is electrically connected between the first input of each of said converters and the common ground.

14. The power flow regulator of claim 11 wherein said plurality of mono-directional DC-DC converters are a first plurality of mono-directional DC-DC converters;
    wherein said capacitor is a first capacitor; and wherein said common DC load comprises:
       a second plurality of mono-directional DC-DC converters, each of said second plurality of mono-directional DC-DC converters comprising a first input, a second input, a first output and a second output; and
       a second capacitor electrically connected between the first and second inputs of each of said second plurality of mono-directional DC-DC converters,
       wherein the first input of each of said second plurality of mono-directional DC-DC converters is electrically connected to the first input of each of said first plurality of mono-directional DC-DC converters,
       wherein the first output of each of said second plurality of mono-directional DC-DC converters is electrically connected to the second input of each of said second plurality of mono-directional DC-DC converters, and wherein the second output of each of said second plurality of mono-directional DC-DC converters is electrically connected to a corresponding DC load.

15. The power flow regulator of claim 11 wherein said plurality of mono-directional DC-DC converters are a first plurality of mono-directional DC-DC converters;
wherein said capacitor is a first capacitor; and wherein said common DC source comprises:
a second plurality of mono-directional DC-DC converters, each of said second plurality of mono-directional DC-DC converters comprising a first input, a second input, a first output and a second output; and
a second capacitor electrically connected between the first and second inputs of each of said second plurality of mono-directional DC-DC converters,
wherein the first input of each of said second plurality of mono-directional DC-DC converters is electrically connected to the first input of each of said first plurality of mono-directional DC-DC converters,
wherein the first output of each of said second plurality of mono-directional DC-DC converters is electrically connected to a corresponding DC source, and
wherein the second output of each of said second plurality of mono-directional DC-DC converters is electrically connected to the second input of each of said second plurality of mono-directional DC-DC converters.

16. The power flow regulator of claim 11 wherein said converters further comprise galvanic isolation between the first and second outputs and the first and second inputs.

17. The power flow regulator of claim 11 wherein said converters further comprise no galvanic isolation between the first and second outputs and the first and second inputs.

18. The power flow regulator of claim 11 wherein a positive constant DC voltage is across the capacitor between the first and second inputs of each of said converters.

19. The power flow regulator of claim 11 wherein a positive voltage is between the first and second outputs of each of said converters.

20. The power flow regulator of claim 11 wherein a negative constant DC voltage is across the capacitor between the first and second inputs of each of said converters; and wherein a negative voltage is between the first and second outputs of each of said converters.

* * * * *